United States Patent [19]

Vincent et al.

[11] 4,003,136

[45] Jan. 18, 1977

[54] METHOD FOR THE DRYING AND RECOVERY OF POLYETHYLENE WASTE MATERIAL

[76] Inventors: David N. Vincent; Charles L. Segal, both of 6458 Bluefield Place, San Diego, Calif. 92120

[22] Filed: Feb. 3, 1975

[21] Appl. No.: 546,441

[52] U.S. Cl. .................................. 34/12; 34/26; 34/30; 34/53

[51] Int. Cl.² ........................................ F26B 7/00

[58] Field of Search ............... 34/8, 12, 22, 26, 58, 34/60, 61, 30, 53

[56] References Cited

UNITED STATES PATENTS

| | | | |
|---|---|---|---|
| 2,657,472 | 11/1953 | Fry, Jr. .................................... | 34/8 |
| 3,509,245 | 4/1970 | Santangelo et al. ................. | 34/8 X |
| 3,631,605 | 1/1972 | Wylie et al. .......................... | 34/60 |
| 3,905,122 | 9/1975 | Ohshima et al. ..................... | 34/60 |

*Primary Examiner*—John J. Camby
*Attorney, Agent, or Firm*—Charles T. Silberberg

[57] ABSTRACT

A method for drying and recovering polyethylene waste material is disclosed. In the preferred procedure, the raw waste material is defiberized, dried in a novel manner, and then pelletized into the finished product which is suitable for plastic processing. The drying process for the waste material provides for temperature control of heated air at specific places.

14 Claims, 4 Drawing Figures

4,003,136

METHOD FOR THE DRYING AND RECOVERY OF POLYETHYLENE WASTE MATERIAL

BACKGROUND OF THE INVENTION

For many years, polyethylene coated paper products have been in popular use for the manufacture of milk cartons, paper cups, disposable diapers and the like. Manufacturers of these items generate considerable amounts of scrap material from edge trimmings, stampings, and rejects. This scrap material is routinely reprocessed in conventional hydropulpers to recover the cellulose fiber. The polyethylene, separated from the fiber slurry in the hydropulper by coarse screens, is discarded by dumping in land fill areas or by incineration. It is estimated that from about 25 to 50 million pounds of polyethylene waste, on a dry polymer basis, are generated annually in the United States by these fiber recovery plants.

The polyethylene waste is obtained from the hydropulper in the form of narrow strips or folded pieces of thin film contaminated with cellulose fiber and water, resembling very coarse saurkraut. Typically, the waste material contains approximately 40 to 70% by weight water and 30 to 60% dry solids, i.e., the cellulose fiber and polyethylene with the water removed. Approximately 10 to 40% by weight of the dry solids is cellulose fiber. Thus, for example, a particular batch of waste material having 50% water and 20% cellulose contamination would have an overall composition of 50% water and 50% dry solids of which 20% is cellulose fiber and 80% is polyethylene. The bulk density of the dry solids is about 3 pounds per cubic foot; approximately 10–20 pounds per cubic foot in wet form.

Under current practice, the wet polyethylene waste material is loaded onto trucks and dumped in land fill areas as refuse or mixed with other burnable wastes and incinerated. Such disposal procedures are expensive and undesirable. For land fill disposal, the material is bulky, consumes much space, is unsightly, and is easily blown away by winds. For incineration, the bulky nature of the material creates problems in feeding the material to the incinerators, the high water content reduces combustion efficiency, and the thermoplastic nature of polyethylene results in the material fusing and sticking to the grates. Furthermore, polyethylene is not biodegradable and remains in the land fill areas for very long periods of time, restricting the further reuse of the area. Thus, this material is considered to have a negative value and to be a nuisance in disposal areas.

Many attempts have been made to utilize this polyethylene waste material directly or to reprocess it into a more useable form. However the high water contend and low bulk density of this material has prohibited its economic utilization. Most plastic processing equipment cannot utilize materials of low bulk density, generally being designed with compaction ratios of about 2 or 3 to 1. The polyethylene waste material, for possible utilization, must be compacted from about 3 pounds per cubic foot to about 60 pounds per cubic foot. This requires a ratio of 20 to 1 which is unacceptable for state of the art plastic processing equipment.

Drying the waste material has also proven economically prohibitive. Its low bulk density limits the amount of material (by weight) that can be charged to a drying machine. The high water content requires long drying cycles. Thus, the combination of a long drying time with a sample load weight results in a very uneconomical and impractical process. In addition, polyethylene is sensitive to heat and will melt or fuse if heated much about 175° or 180° F. Thus, the drying process cannot be accelerated by raising the temperature. Furthermore, any local overheating of the dryer will cause the polyethylene to fuse and stick to the body of the drier.

SUMMARY OF THE INVENTION

One object of this invention is to provide a process that will efficiently and economically convert wet, fiber contaminated, low bulk density polyethylene waste material, obtained from hydropulping scrap polyethylene coated paper products, into a dry granulated or pelletized form that can be utilized in standard plastic fabricating machines, such as injection molding machines or extruders.

Another object of this invention is to provide a process that will upgrade the properties and the value of waste polyethylene material by removing the contaminents from the polyethylene material.

It is yet another object of the present invention to provide a novel drying process for economically drying the polyethylene waste material or the defiberized polyethylene waste material that substantially obviates fusing of the waste material to the drier.

Briefly, in accordance with the invention, there is provided a method for converting wet, fiber contaminated, low bulk density, polyethylene waste material into a dry pelletized form. The raw waste material is preferably defiberized, dried in a novel manner, and pelletized into the finished product. Drying of the waste material, which is suitably confined, is by heated air, the temperature of which is controlled at specified location.

Other objects and advantages of the invention will become apparent upon reading the following detailed description and upon reference to the drawings.

Figure 1:
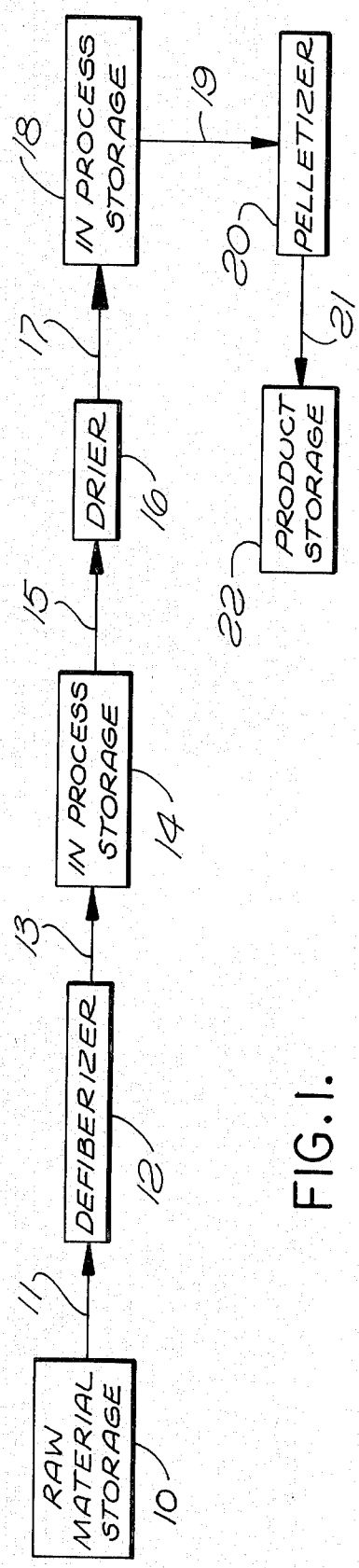
FIG. 1 is an overall schematic view of the preferred method for converting the raw waste material to a useful dry pelletized finished product.

While the invention will be described in connection with the preferred process and apparatus, it will be understood that it is not intended to limit the invention thereto. On the contrary, it is intended to cover all alternatives, modifications, and equivalents that may be included within the spirit and scope of the invention as defined by the appended claims.

DETAILED DESCRIPTION OF THE INVENTION

The process of this invention is best described by reference to the schematic diagram illustrated in FIG. 1. The polyethylene waste material is received in storage bin 10 and is transported by conveyor 11 to defiberizer 12. Defiberization of the polyethylene waste material, that is, the removal of the cellulose fiber contaminants, is a desirable step in the process sequence, since it has been found that the cellulose fiber tenaciously holds onto water, thereby requiring extrordinarily long times in the subsequent drying step and a contaminated finished product results. On an economic basis, it is impractical to dry scrap material of this type having a fiber content, on a dry solids basis, of more than about 5 or 10%.

Defiberization can be accomplished in a number of ways with varying degrees of efficiency. For example, the contaminated waste material can be recharged to a hydropulper and beaten with fresh water. By using large volumes of water and long beating times, the fiber content can be reduced in this way to about 5%.

A more efficient defiberization process is based on the hydrolysis of the cellulose fiber to water soluble products by hot dilute acid. With this treatment the fiber can be essentially completely eliminated, thus providing a high quality recovered polyethylene, since even small percentages of fiber cause surface imperfections in subsequently fabricated items and can also plug or clog fabrication dies.

A preferred method of defiberization consists of suspending the polyethylene waste material in 3 to 25% by weight, preferably 10 to 15% by weight, aqueous acid, preferably sulfuric acid, at from 120° F to 220° F, preferably 170° F to 190° F, and agitating the mixture for 20 to 120 minutes. The specific conditions for the hydrolysis reaction are interdependant, higher acid concentrations, higher temperatures and greater agitations resulting in shorter processing times. Thus, for example, the use of 15% by weight sulfuric acid solution at 190° F with vigorous agitation requires only about 45 minutes of reaction time to remove essentially all of the fiber. In any case, the required reaction time under any specific set of conditions can be easily determined by periodically inspecting the polyethylene.

The hydrolysis reaction described above can be carried out in a simple tank and agitator, suitable for handling hot acid. With such equipment, however, only about ½ to 1 pound of polyethylene scrap material, on a dry polyethylene basis (with water and fiber removed) can be charged per gallon of aqueous acid.

A more preferred apparatus for carrying out the hydrolysis reaction is a modified conventional commerical laundry washer. The most preferred apparatus is a modified concrete mixer. The use of this type of equipment allows up to about 3 pounds of material, on a dry polyethylene basis, to be charged per gallon of reaction fluid.

A suitable commercial laundry washer comprises a horizontally mounted, rotating, perforated drum that lifts the material, by means of either ribs attached to the inner circumference or by virtue of a flat-sided (e.g. octahedral) design, and allows it to fall back into the fluid, thus generating a beating action within the material. For use in this process, the washer must be constructed out of suitable materials to withstand the hot acid, e.g. stainless steel, or mild steel with an acid resistant coating such as an epoxy or phenolic composition. The rotational speed of the drum should also be adjusted so that the material rises close to the vertical before falling back. This speed depends upon the diameter and geometry of the drum, being in the range of 15 to 25 RPM for a 5 foot diameter drum. Additionally, to facilitate handling of the hot, acidic slurry, it is most desirous for the machine to be designed so that the drum stops in either of two positions; with the loading ports up for charging material and with the ports facing down for discharging. Hydraulically actuated pistons are also installed to open and close the port covers.

The commercial laundry washer is further modified so that the perforations in the rotating drum are about ¼ inch in diameter, rather than the ½ to ⅝ inch perforations normally used. The smaller perforations are required to prevent material from passing through the perforations and interfering with externally mounted fluid flow systems.

An example of a suitable commercial laundry washer which can be easily modified in the above described manner by the manufacturer is the ROSCO washer manufactured by the Sam Ross Laundry Machinery Company of Los Angeles, Calif.

The most preferred apparatus for carrying out the hydrolysis reaction is a concrete mixer modified to contain two continuous, helical shelves attached to the inner circumference of the conical angularly mounted drum. Additionally, a perforated plate is mounted near the closed end of the drum to allow for drainage and recirculation of the fluid. A siphon tube, mounted between the perforated plate and the closed end of the drum, and connected to an external pump is used to recirculate or drain the fluid. All exposed parts must be constructed of or coated with materials that will withstand the hot acidic environment utilized in this process.

The drum is rotated by an external, variable speed, reversable drive, such as a hydraulic drive, with a speed capability, for a 7 to 8 foot diameter drum, of 0 to 18 RPM.

In operation, when the drum is driven in the foreward direction, the helicies throw the material toward the closed (lower) end of the drum. After processing, the drum rotation is reversed, whereupon the helicies lift the material to the open (upper) end and discharges the material from the drum.

An example of a commercially available machine that can be easily modified in the above described manner by the manufacturer is the CHALLENGE Hide Processor, manufactured by Challenge-Cook Bros., City of Industry, Calif., for use in the leather industry.

Figure 2:
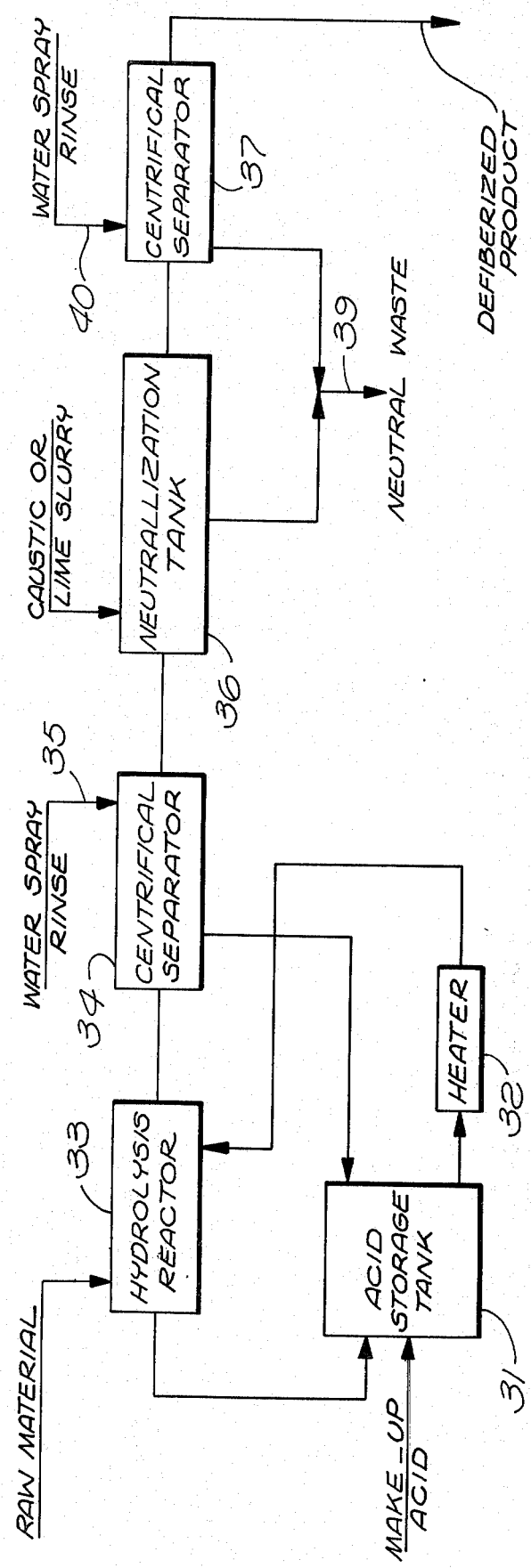
FIG. 2 is a schematic view of the preferred method for defiberizing the raw waste material.

In any case, as shown in FIG. 2, the hydrolysis reactor 33 is externally fitted with a pump (not shown) which recirculates the acid from storage tank 31 through a heat exchanger or in-line immersion heater 32 to the previously described hydrolysis reactor 33 to maintain the operating temperature.

After the hydrolysis reaction, the material is rinsed and neutralized. The material is discharged from the reactor 33 into centrifugal separator 34. This centrifuge is of the perforated basket type and may be either a standard chemical centrifuge or a commercial laundry extractor of stainless steel or other acid protected construction. Centrifuge 34 is fitted with spray nozzle 35 to provide a water rinse to remove excess acid. After rinsing, the material is placed in neutralization tank 36 where it is contacted with an alkaline solution, such as dilute caustic soda or a lime slurry, to neutralize the residual acid adhering to the polyethylene. The material is then passed to centrifugal separator 37 where excess fluid 39 is removed and the material is rinsed again by means of the spray nozzle 40. Due to the batch nature of the process, the same centrifugal separator may be used in both of the above processing steps requiring its use.

It should be noted that it is essential to completely neutralize any residual acid adhering to the polyethylene. The presence of even small quantities of residual acid results in severe discoloration of the polyethylene when it is heated during subsequent pelletizing or molding operations. On the other hand, small quantities of contaminants from the neutralization step, e.g., calcium sulfate and calcium hydroxide, are quite inert and, in fact, often added to various plastics as fillers or stabilizers.

Figure 3:
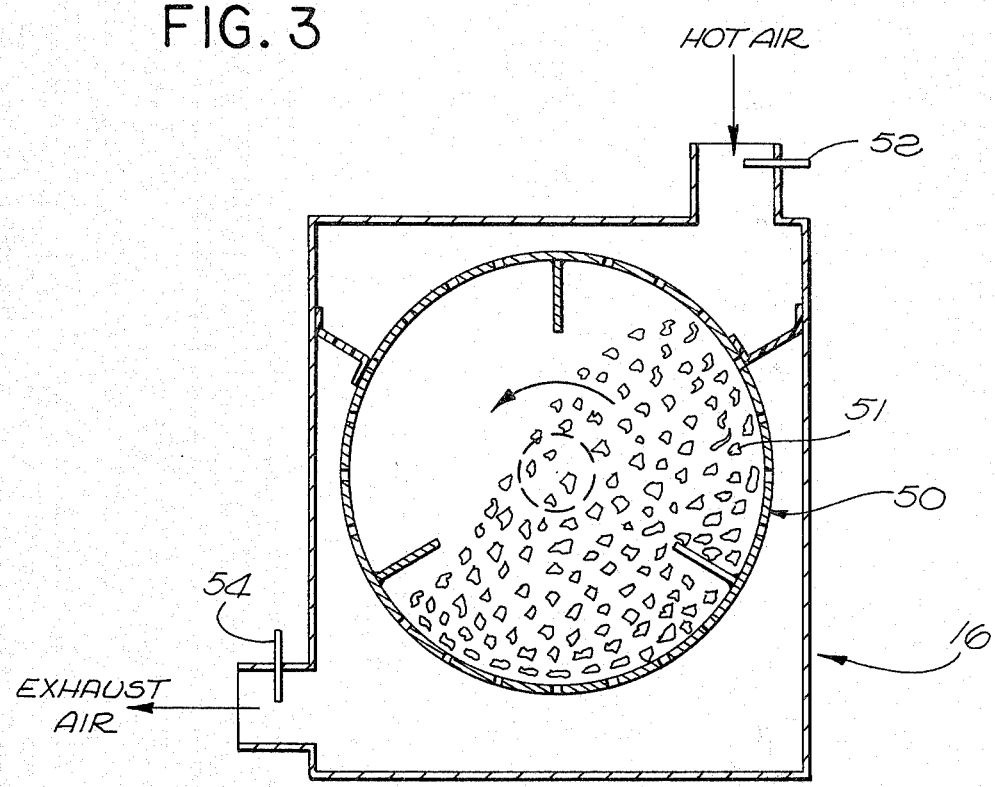
FIG. 3 is a diagramatic cross-sectional elevational view of a drier for carrying out the present invention.

Referring back to the process flow sheet in FIG. 1, defiberized wet material is transported from the defiberization unit 12 to drier 16 by means of conveyors 13 and 15 and intermediate storage vessel 14. As mentioned previously, the drying of this polyethylene scrap material has been economically prohibitive, since the material is quite sensitive to heat and is easily fused, thus sticking to the walls of the driers. Many types of commercial driers have been tried and found lacking. A successful dryer must operate at a high air flow rate and a low, controlled temperature. The fluffy nature of the dried material also requires that the material be well confined during exposure to the high velocity air. A suitable piece of equipment for drying the defiberized polyethylene scrap material is a modified commercial laundry tumbler type gas-fired drier such as illustrated in FIG. 3. The perforated drum 50 of this drier 16 should have ¼ to ⅜ inch perforations so as to retain the scrap material 51. The heating unit must be modified by reducing the number of burners or jets so as to provide only about 40 to 70% of the heat energy normally designed into such units. Furthermore, and most importantly, instrumentation must be provided to control the inlet air temperature. Most driers of this type are provided with thermoregulators which control the outlet air temperature. This type of control is ineffective for drying the polyethylene scrap material, since it leads to overheating and fusing this material or to overheating the metal parts of the drier which come in contact with the polyethylene, again causing fusion and sticking. It has been found that these problems can be eliminated by controlling the inlet air temperature rather than the outlet air temperature and by reducing the heat input so as to avoid frequent on-off burner cycling.

Thus, for example, a ROSCO gas heat 200 pound commercial laundry tumbler dryer, manufactured by the Sam Ross Laundry Machinery Company, Los Angeles, Calif., was modified by reducing the burner capacity to about 900,000 btu/hr with an air flow rate of about 10,000 cubic feet per minute. A thermoregulator 52 was mounted in the incoming heated air stream so as to control the incoming hot air at a predetermined temperature between about 140° F and 180° F, preferably between about 150 ° F and 170° F. Preferably, the burners are fitted with a proportional gas control valve which will throttle the gas flow to the required level.

Alternatively, a steam heated or an electrically heated drier, having similar temperature control and a suitably high air flow rate can be employed.

The polyethylene scrap material need not be completely dried upon discharge from the drier, since the subsequent pelletizing step can tolerate 5 to 10% moisture in the scrap material. Actually, it is beneficial to retain a low moisture level after drying the polyethylene. In the "bone dry" condition the polyethylene scrap material is extremely light and fluffy and also easily picks up a static electricity charge, making the handling of the material in this state very awkward and difficult. The retention of a small quantity of moisture eliminates these problems and facilitates the handling of the material. Additionally, drying the material to a 5 to 10% moisture level reduces the required drying time and also reduces the possibility of overheating and fusing the polyethylene.

The moisture level of the polyethylene scrap material at the end of the drying cycle can be suitably controlled by utilizing a second thermoregulator 54 installed in the outlet air flow designed to shut off the drier when outlet air temperature reaches a predetermined level. By setting this thermoregulator at about 3° to 15° F, preferably 5°–10° F lower than the inlet air temperature, the drying cycle will terminate at the desired moisture content. The actual temperature differential between the inlet and outlet air to provide a given moisture content is dependent upon the drier geometry, air flow rate, etc, and can be easily determined by inspection.

Figure 4:
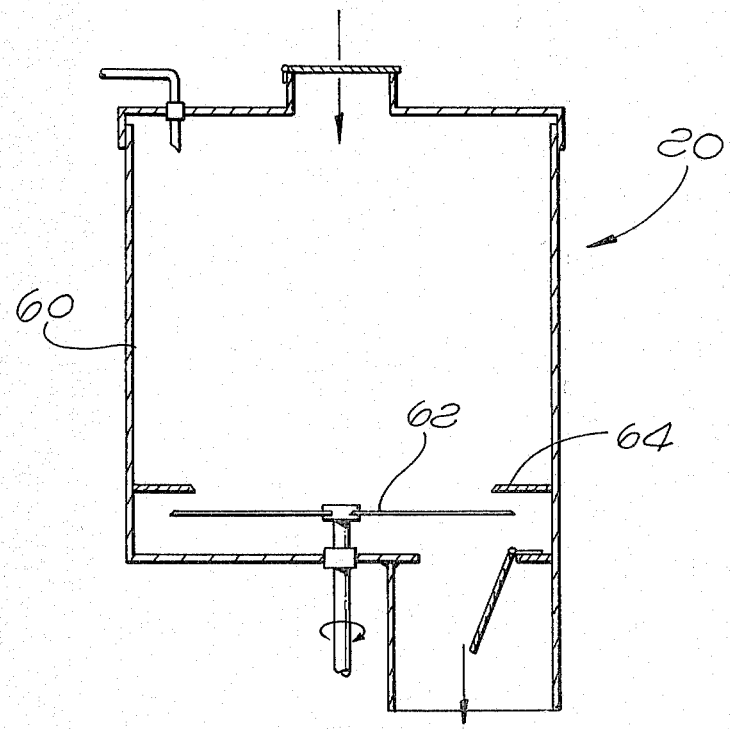
FIG. 4 is a diagramatic cross-sectional elevational view of a preferred form of pelletizing apparatus for carrying out the present invention.

The dried material is transported from drier 16 to pelletizer 20 by means of conveyers 17 and 19 and intermediate storage vessel 18. The pellitizer unit is, most preferably, the "Poly Puff" machine built and supplied by Gene Lowey Inc., Hamilton, Ohio and illustrated in FIG. 4. This machine is, essentially a 3 foot diameter by 4½ foot high steel tank 60 with a high speed rotary blade 62 mounted in a horizontal position near the bottom and ten stationery blades 64 mounted vertically around the circumference. In operation it is similar to a very highly powered and ruggedly built kitchen food blender. This machine is conventionally used to reclaim plastic film scrap by converting it to a granular form suitable for use as a feed stock for conventional molding and extrusion machines. Dried material is fed through inlet port 66 into tank 60 where it is granulated by action of blades 62 and 64. The action of blade 62 also causes fusing of the material due to frictional heat generated. Other machines of similar design are the Zerglomat, manufactured by Bolton-Emerson Inc., Lawrence, Mass. and the Sentinel Scrap Recovery Unit, manufactured by Packaging Industries Inc., Hyannis, Mass.

Alternatively, the dried polyethylene scrap can be compacted with a Hay Cuber, such as that manufactured by John Deere Inc., suitably modified. This machine normally feeds chopped hay into the interior of a thin cylinder, the circumference of which is formed of 66 radially mounted dies each about 3 inches long with about a one inch square cross sectional opening. An eccentrically mounted rotor, travelling around the inner circumference at the inner die faces, forces the chopped hay into the dies. The force to push the material through the dies results in the compaction of the hay, which emerges from the outer die faces in the form of a one inch square extrudate. The brittle nature of the compacted hay results in the extruded bars breaking under their own weight, forming pieces about 1½ to 2 inches long.

In order to be used for the compaction of the dried polyethylene scrap material, this machine must be modified in several minor ways. First, the dies must be heated to between about 300° to 350° F. This can be easily accomplished by mounting electrical strip heaters on both sides of the dies and suitably grooving the die body and the cover plates to accept the heaters, together with an insulation layer. Secondly, the dies are modified to provide greater compaction by increasing the taper and reducing the cross-sectional area of the opening. Thus, for example, each die is constructed so as to have a 1¼ inch by 1¼ inch opening at the inner face, tapering to a ¾ inch by ¾ inch opening at the outer face. Finally, a rotating knife is mounted so as to travel across the outer circumference at the die faces, cutting the extrudate into pieces of convenient length. This knife is electrically heated to about 500° F to facilitate the cutting of the extrudate. The length of the pieces can be varied by adjusting the speed of the rotating knife.

In operation, the modified hay cuber machine forces the polyethylene scrap into the dies where it is compacted. Simultaneously, the heated surfaces of the dies fuse the polyethylene coming in contact with them, forming a thin skin around the compacted mass. The heated knife used to cut the extrudate also serves to fuse and seal the ends of the cubes.

The "macro" pellets formed in this process step are, essentially, compacted polyethylene scrap material encapsulated with a thin skin of fused polyethylene. Using the dies previously described, they are approximately 1 inch cubes with a density of between about 30 and about 45 pounds per cubic foot. While these cubes are suitable feed stock for some large extruders, they are most beneficially fed into a standard pelletizing extruder to form conventional pellets.

Another alternative method of pelletizing the scrap consists of stuffing the dried fluffy material, by means of an auger type stuffing screw, into a wide throated pelletizing extruder equiped with a high compression, deep flighted screw and a vented barrel. However, this method is not preferred since the polyethylene scrap frequently clogs the feed ports and results in erratic flow of the extrudate.

The following are examples of practice of the invention, but are not limitative of the benefits and advantages obtained by practice thereof.

EXAMPLE I

Two hundred pounds of polyethylene scrap material obtained from the hydropulping of milk carton trimmings, assayed as containing about 60% water, about 8% paper and about 32% polyethylene, were added to 100 gallons of 15% aqueous sulfuric acid at 190° F. The mixture was stirred at this temperature for 1 hour, the liquid drained, and the wet material transferred to a centrifuge where additional liquid was removed and the material given a spray rinse. The wet solid was then placed in another tank containing an aqueous slurry of lime and stirred for 10 minutes. The neutralized material was again centrifuged and given a spray rinse.

The material removed from the centrifuge contained about 40% water. No paper fibers were visibly present in the polyethylene.

EXAMPLE II

One hundred pounds of wet defiberized polyethylene, prepared as described in Example I, containing about 40% water, about 60% polyethylene and no discernable paper fiber, was loaded into a gas-fired ROSCO laundry drier modified so as to have a heat input of aout 1 million btu/hr and a temperature controller on the input air. The air velocity was set at 10,000 cfm and the input air temperature at 160° F. After drying for 5 minutes, the material was discharged and had a moisture content of about 5%.

EXAMPLE III

One hundred fifty pounds of dry defiberized polyethylene, prepared as described in Example II, was charged to a Gene Lowey Inc., Poly-Puff Machine. After several minutes the heat generated by the mechanical action fused the polyethylene, whereupon the mass was quenched by the addition of about 1½ quarts of water. The quenched mass was granulated by the further action of the rotating blade and the resulting granules or pellets discharged from the machine. The heat generated in the process was sufficient to vaporize the water, thus producing an essentially dry pelletized product. The total cycle time was 6 minutes.

EXAMPLE IV

Dried, but not defiberized, polyethylene scrap material (containing about 10% paper fiber) was charged to a John Deere, Inc., Hay Cuber, the dies of which were preheated to about 350° F. Examination of the extrudate revealed that it consisted of compacted polyethylene scrap material covered with an approximately 1/32 inch skin of fused polyethylene. The density of the extrudate ranged between about 35 and about 40 pounds per cubic foot.

EXAMPLE V

A Challenge-Cook Bros., Inc., Model HP-200 Hide Processor is provided with a plate with ¼ inch perforations near the closed end of the tank and with a fluid recirculation system. One Thousand Gallons of 15% aqueous sulfuric acid are charged to the tank and heated to 200 F. by the injection of 80 psi steam. Three thousand pounds of wet polyethylene scrap material, assayed as containing about 50% water, about 10% paper, and about 40% polyethylene, is added and the tank rotated at about 15 rpm. The temperature is maintained at 190° F. by the periodic injection of steam into the recirculating fluid. After 1 hour, the excess fluid is pumped off, the material slurried in fresh water which is again drained off, and slurried in an aqueous lime slurry to neutralize residual acid. After a final water rinse, the material is discharged into a centrifuge where excess water is removed.

The material removed from the centrifuge contains about 40% water. No paper fibers are visibly present in the polyethylene.

Thus, it is apparent that there has been provided, in accordance with the invention, a method for the drying and recovery of polyethylene waste material that fully satisfies the objects, aims, and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall within the spirit and scope of the appended claims.

What is claimed is:

1. A method for drying wet polyethylene waste material to a predetermined moisture level, said waste material being confined in an enclosure, said enclosure having a hollow drum and an air inlet and outlet therein, said drum defining an enclosed area and having perforations of a size suitable for retaining said waste material, comprising:

exposing said waste material to a high velocity heated air flowing into said enclosure through said inlet and out of said enclosure through said outlet, controlling the temperature of said heated air at said inlet to be at a specified value within a predetermined temperature range, whereby said waste material is dried by said heated air with minimal fusing of said waste material to said drum, and controlling the time duration that said waste material is exposed to high velocity heated air by terminating said heated air flow when the temperature of said heated air at said outlet reaches a specified temperature between about 3° F and about 15° F lower than said specified value at said inlet.

2. The method as set out in claim 1 wherein said predetermined temperature range is about 140° F to about 180° F, 3. The method as set out in claim 1 wherein said predetermined temperature range is about 150° F to about 170° F, 4. The method as set out in claim 1 wherein said moisture level of said waste material is between about 5 and about 10 percent, said heated air temperature at said inlet is controlled by a thermoregulator and said time duration is controlled by a second thermoregulator.

5. The method as set out in claim 1 wherein said heated air flows into said enclosure at a rate of about 10,000 cubic feet per minute.

6. A method for reprocessing into a dry pelletized form wet polyethylene waste material containing cellulose fiber contaminants, comprising:

defiberizing said waste material to remove said fiber contaminants;

drying said waste material to a predetermined moisture level within an enclosure, said enclosure having a hollow drum and an air inlet and outlet therein, said drum defining an enclosed area and having perforations of a size suitable for retaining said waste material, said drying comprising the steps of:

exposing said waste material to high velocity heated air flowing into said enclosure through said inlet and out of said enclosure through said outlet, controlling the temperature of said heated air at said inlet to be at a specified value within a predetermined temperature range, whereby said waste material is dried by said heated air, and controlling the time duration said waste material is exposed to high velocity heated air; and pelletizing said dried waste material.

7. The method as set out in claim 6 wherein said defiberizing comprises the steps of:

suspending said polyethylene waste material in heated aqueous acid, said heated aqueous acid being maintained with a predetermined temperature range, and having a concentration within a predetermined range; and agitating the mixture of waste material and aqueous acid whereby said fiber contaminants are converted to water soluble products.

8. The method as set out in claim 7 wherein said defiberizing also includes, after the step of agitating, the steps of:

rinsing said waste material to remove excess acid, treating said waste material with an alkaline solution to remove excess acid, and removing excess fluid from said waste material.

9. The method as set out in claim 8 wherein said acid temperature range is 120° F. to 220° F., said aqueous acid concentration range is 3 to 25 percent by weight, and said predetermined temperature range of said heated air at said inlet is about 140° F to about 180° F.

10. The method as set out in claim 8 wherein said acid temperature range is 170° F to 190° F., said aqueous acid concentration range is 10 to 15 percent by weight, and said predetermined temperature range of said heated air at said inlet is about 140° F to about 180° F.

11. The method as set out in claim 10 wherein said pelletizing comprises the steps of:

fusing said waste material together, and granulating said fused waste material.

12. The method as set out in claim 6 wherein said predetermined temperature range of said heated air at said inlet is about 140° F to about 180° F.

13. The method as set out in claim 6 wherein said predetermined temperature range of said heated air at said inlet is about 150° F to about 170° F.

14. The method as set out in claim 6 wherein said time duration is controlled by terminating said heated air flow when the temperature of said heated air at said outlet reaches a specified temperature between about 3° F and about 15° F lower than said specified value at said inlet.

* * * * *